A. S. KROTZ.
LIFTING DEVICE FOR PLOWS.
APPLICATION FILED MAY 2, 1921.
1,409,219.
Patented Mar. 14, 1922.
2 SHEETS—SHEET 1.
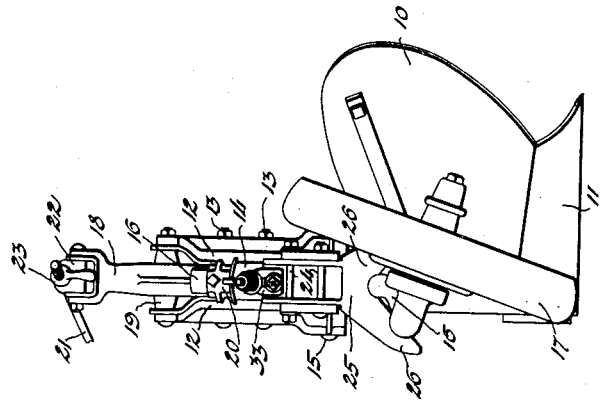
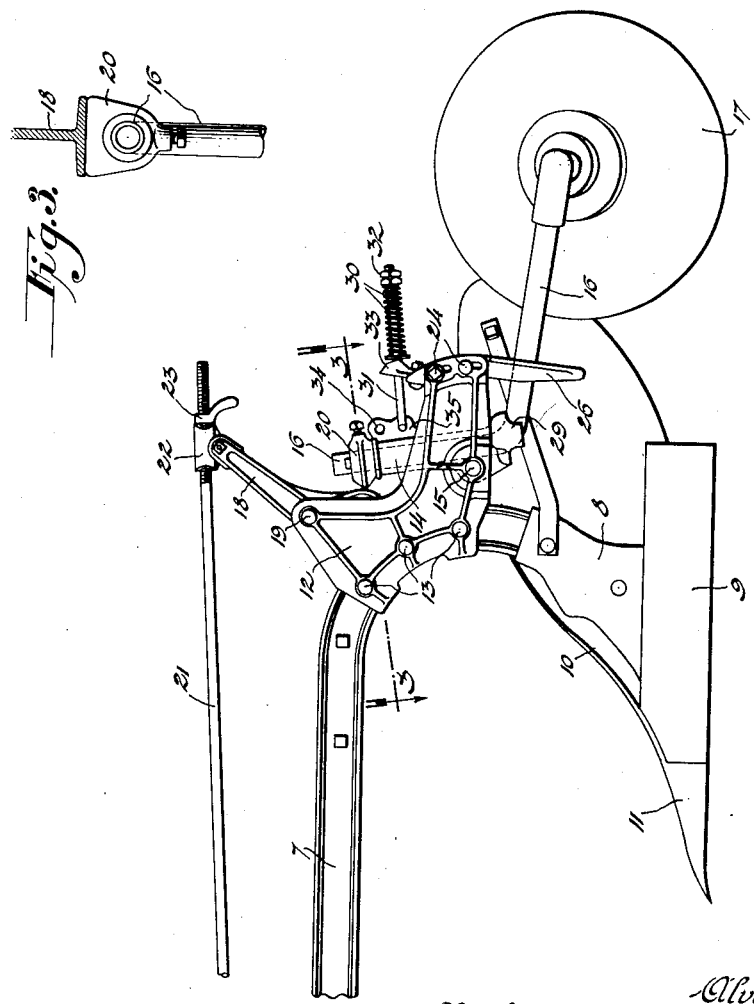
Inventor:
Alvaro S. Krotz
By his Attorneys
Blackmore, Spencer & Flint.

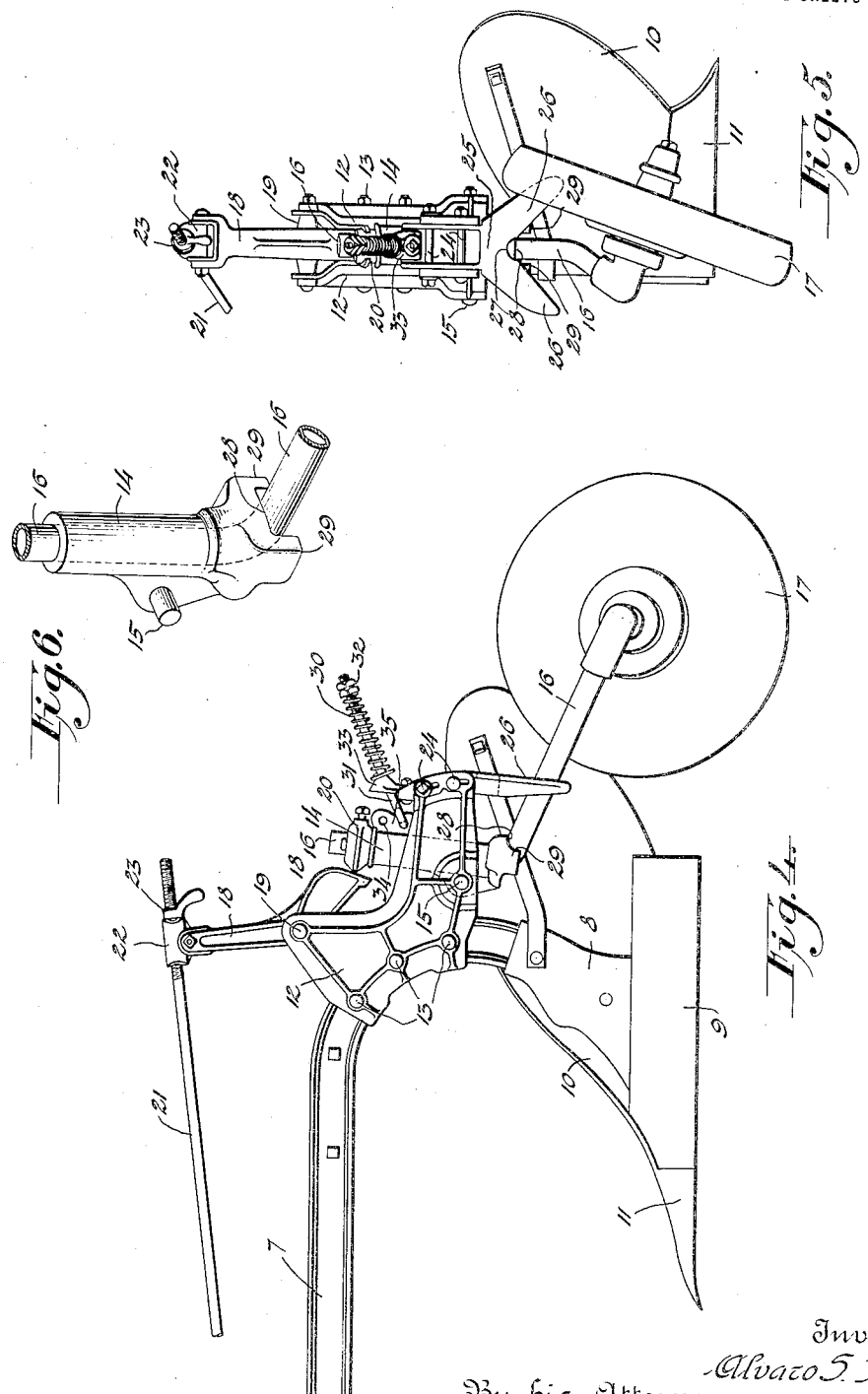

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

LIFTING DEVICE FOR PLOWS.

1,409,219.  Specification of Letters Patent.  Patented Mar. 14, 1922.

Application filed May 2, 1921. Serial No. 465,956.

*To all whom it may concern:*

Be it known that I, ALVARO S. KROTZ, a citizen of the United States, and a resident of Janesville, county of Rock, and State of Wisconsin, have invented certain new and useful Improvements in Lifting Devices for Plows, of which the following is a full, clear, concise, and exact description, such as will enable others skilled in the art to which the invention relates to make and use the same, reference being made therein to the accompanying drawings, which form a part of this specification.

My invention relates to plows, and particularly to plows designed to be drawn by tractors and having a rear guide wheel running in the furrow formed by the plow, and having lifting mechanism co-operating with said wheel to lift the plow and which wheel acts as an abutment during the lifting operation.

The principal object of my invention is to provide improved locking mechanism associated with the rear guiding wheel of the plow and adapted to hold the same fixedly when the plow bottom is in its lowermost position, as when a furrow is being turned; but which locking means is inoperative when the plow bottom is in its lifted and uppermost position, so that the wheel may trail behind the plow and act as a caster thus facilitating the turning at the corners of a field or at the ends of the furrows.

A further object of my invention is to provide improved counterbalancing means associated with the rear guide wheel and the lifting mechanism co-operating therewith, and which counterbalancing means acts in conjunction with the lifting mechanism to thereby make the lifting of the plow bottom the easier.

A further object of my invention is to provide lifting mechanism for plows of the type hereinbefore referred to and in which the rear guide wheel is positively locked in a central position when the plow bottom is in its down position, and yieldably held in a central position when the plow is raised; and in which movement of said wheel from side to side as a caster is opposed by the weight of the plow when the plow bottom is in an elevated position to thereby provide lifting mechanism wherein the rear wheel is normally held in a central position when the plow is elevated, but is nevertheless free to act as a caster when such action is necessary.

With the above and other objects of invention in view my invention consists in the improved lifting mechanism for plows illustrated in the accompanying drawings and hereinafter described and claimed; and in such variations and modifications thereof, within the scope of the concluding claims, as will be obvious to those skilled in the art to which my invention relates.

In the drawings wherein the preferred embodiment of my invention is illustrated:

Figure 1 is a fragmentary view showing the rear end of a plow in side elevation and equipped with my improved lifting mechanism, the position of the parts being that which they assume when the plow is in its lowermost or plowing position.

Figure 2 is a view corresponding with Figure 1 as regards the positions of the parts, but showing the plow and lifting mechanism in elevation and as seen from a position at the rear of the plow.

Figure 3 is a fragmentary view showing a section upon a plane indicated by the line 3—3, Figure 1.

Figure 4 is a view corresponding with Figure 1, but showing the plow in its raised position.

Figure 5 is a view showing the parts shown in Figure 4 in elevation, and as seen from a position at the rear of the plow.

Figure 6 is a perspective view showing an oscillating sleeve and parts associated therewith which forms a part of the lifting mechanism involved in my invention.

Referring now to the drawings, the reference numeral 7 designates the rear portion of a suitable plow beam or frame the forward end of which may be connected with a tractor or other draft device in any way so as to be drawn thereby; and the rear end of which beam is curved downward, and carries the frog 8 provided for facilitating the securing of the land side 9, the mold board 10 and the point or share 11 in proper positions relative to one another to form a plow body or plow bottom.

Secured to the rear curved portion of the beam 7 are two plate or bracket members 12, 12, said members being shown as held in place by a suitable number of bolts 13 extending through them and through holes provided in the frame; and the reference numeral 14 designates a tubular oscillating sleeve pivotally supported between the bracket plates 12 upon a pin 15 extending through holes in said members.

A bent axle 16 has its upper end extending loosely through the hollow sleeve 14 which provides a bearing for said upper end; and its lower end extending rearwardly, and bent laterally at substantially a right angle to provide an axle for and upon which the rear caster and guide wheel 17 is rotatably supported; from which it follows that swinging movement of the sleeve member upon the pivot at 15 is accompanied by an up and down movement of the wheel 17, and that the rearwardly extending arm of the shaft 16 and the said wheel 17 may swing from side to side, when not prevented from doing so as will hereinafter appear, thus permitting the wheel to act as a caster and follow the plow when the plow is moving in a direction other than a straight ahead direction.

The reference numeral 18 designates an oscillating lever which is pivotally supported at 19 between the plates 12 and the lower end of which lever bears against a cam or collar 20 secured in place upon the upper end of the axle 16, so that when the upper end of said lever is moved to the left by force communicated thereto through the lifting rod 21 the sleeve 14 will be moved about the pivot 15 as an axis from the position shown in Figure 1 into the position illustrated in Figure 4; with a resulting movement of the guide wheel 17 downward; and a lifting of the rear end of the plow beam and plow; as the guide wheel runs in the furrow and provides a fixed abutment for resisting the forces incidental to the lifting operation. The rear end of the rod 21 extends through a swivel block 22 carried by the lever 18, and the effective length of said rod may be varied by the nut 23 as will be understood.

Secured in place between the plates 12, preferably by means of bolts 24 extending through slots in said plates so as to provide for adjustment thereof, is a stationary locking member 25 bifurcated at its lower end to provide diverging arms 26, 26 between which the rearwardly extending arm of the bent shaft 16 lies in all positions of the parts; and the inner edges of which arms engage said bent shaft and return it to a central position when the plow is dropped from the out of the ground position shown in Figure 4 into the working position shown in Figure 1. When the plow is in its lowered operative position the rearwardly extending arm of the guide wheel supporting shaft 16 rests in the angle at the upper meeting portions of the arms 26 thus locking the parts together and preventing sidewise movement of the shaft; whereas when the said sleeve and shaft are swung into the position shown in Figure 4 the shaft is free to oscillate within its bearing in the sleeve 14, its movements, however, being restricted, and arrested by engagement with the side edges of the arms 26, as will be appreciated.

The adjustment of the lifting rod 21 is preferably such that there is a slight gap between the nut 23 and block 22 when the plow is down, so that at such times the rear end of the beam will be supported by engaging abutments provided by the rearwardly extending portion of the wheel supporting shaft and the crotch of the locking member from which the arms 26 diverge, and the lifting mechanism other than those thus in engagement relieved from strain; a circular seat being formed at 27 to receive the shaft and hold it firmly in the central position which it then assumes, as best shown in Figure 5; and the depth to which the plow descends before being arrested by engagement of the bent shaft in the crotch of the locking member may be varied by adjusting the locking member vertically, this being permitted by the bolts 24 and the slots in the brackets 12 through which said bolts extend as hereinbefore explained.

The collar or cam 20 is substantially triangular in form as shown in Figure 3 and a flat side thereof rests against a flat cam surface at the lower end of the lever 18, with the result that the rearwardly extending arm of the bent shaft 16 occupies a normally central position, and extends straight back from the plow, when the plow is in the raised position shown in Figure 4; the weight of the plow acting through the bent shaft to force the collar against the lower end of the lever. It therefore follows that movement of the guide wheel to one side or the other will be opposed by the weight of the plow, and will be accompanied by a slight further lifting of the plow; and that the guide wheel, while free to swing and act as a caster, is nevertheless yieldably held in a central position when the plow is raised from the ground. This holding of the guide wheel in a normal central position permits the plow to be readily backed, the holding force being sufficient to hold the guide wheel central during ordinary backing movements, while at the same time the guide wheel is free to act as a caster in turning corners.

The lower end of the sleeve 14 is provided with an enlarged portion having a bearing surface 28 to receive the upward thrust of the shaft 16 due to the weight of the plow, and with depending lugs 29 disposed one upon either side of the shaft and which, in conjunction with the arms 26, act to limit the sidewise or swinging movement of the said shaft.

The weight of the rear end of the plow beam and of the plow bottom carried thereby is counterbalanced to render the lifting of the plow the easier by a spring 30 which surrounds a hooked bolt 31 and acts under compression between nuts 32 and a fixed abutment 33 carried by the bracket plates 12, and shown as adjustably secured to the upper end of the locking member 25; the inner or hook end of said bolt extending through one or the other of a plurality of holes 34 formed in a rib 35 upon the sleeve 14, to thereby provide for adjustment as regards the counterbalancing effect of the spring 30.

Having thus described and explained my invention, I claim and desire to secure by Letters Patent:

1. In lifting mechanism for plows and in combination with a plow beam or frame, an oscillating sleeve pivotally supported from said beam; an oscillating bent shaft supported within said sleeve, and having a rearwardly extending guide wheel supporting arm; a stationary locking member supported from said beam and with which said arm engages to thereby lock the same in its central position, and which locking member is provided with means for limiting or restricting the swinging movement of said arm when said parts are not locked together; and operating means adapted to swing said sleeve about its point of pivotal support.

2. In lifting mechanism for plows and in combination with a plow beam or frame, two bracket plates secured to said beam and spaced apart from one another; an oscillating sleeve pivotally supported between said bracket plates; an oscillating bent shaft supported within said sleeve, and having a rearwardly extending guide wheel supporting arm; a stationary locking member supported by said bracket plates and with which said arm engages to thereby lock the same in a central position, and which locking member is provided with means for limiting or restricting the swinging movement of said arm when said parts are not locked together; and an oscillating operating member pivotally supported between said bracket plates and operatively associated with said sleeve to operate the same.

3. In lifting mechanism for plows and in combination with a plow beam or frame, two bracket plates secured to said beam and spaced apart from one another; an oscillating sleeve pivotally supported between said bracket plates; an oscillating bent shaft supported within said sleeve, and having a rearwardly extending guide wheel supporting arm; a stationary locking member supported by said bracket plates, and bifurcated at its lower end to provide diverging arms between which the rearwardly extending arm of said bent axle operates; and operating means adapted to swing said sleeve about its point of pivotal support.

4. In lifting mechanism for plows and in combination with a plow beam or frame, two bracket plates secured to said beam and spaced apart from one another; an oscillating sleeve pivotally supported at its lower end between said bracket plates; an oscillating bent shaft having an upwardly extending arm extending through said sleeve, and a rearwardly extending guide wheel supporting arm; a stationary locking member secured in place between said bracket plates and having depending arms diverged from one another and one of which lies upon either side of the rearwardly extending arm aforesaid, and with which said arm engages to thereby limit the extent of swinging movement of said bent shaft; and an operating lever pivotally supported between said bracket plates and adapted to impart oscillatory movement to said sleeve; the arrangement of the parts being such that the rearwardly extending arm of said bent shaft lies within the crotch at the upper ends of said bifurcated arms when the same is in its uppermost position.

5. In lifting mechanism for plows and in combination with a plow beam or frame, an oscillating sleeve pivotally supported from said beam; an oscillating bent shaft supported within said sleeve and having a rearwardly extending guide wheel supporting arm; a stationary locking member supported from said beam and with which said arm engages to thereby lock the same in its central position, and which locking member is provided with means for limiting or restricting the swinging movement of said arm when said parts are not locked together; an oscillating lever supported from said plow beam; and a cam member secured to said oscillating shaft and adapted to be engaged by said lever to thereby impart oscillatory movement to said sleeve, and the form of which cam member is such that said shaft will be normally held in its central position.

6. In lifting mechanism for plows and in combination with a plow beam or frame, an oscillating sleeve pivotally supported from said beam; an oscillating bent shaft supported within said sleeve and having a rearwardly extending guide wheel supporting arm; a stationary locking member supported from said beam and with which said arm engages to thereby lock the same in its central position; an oscillating lever supported from said plow beam; and a cam member secured to said oscillating shaft and adapted to be engaged by said lever to thereby impart oscillatory movement to said sleeve, and the form of which cam member is such that said shaft will be normally held in its central position.

7. In lifting mechanism for plows and in combination with a plow beam or frame, an oscillating sleeve pivotally supported from said beam; an oscillating bent shaft supported within said sleeve and having a rearwardly extending guide wheel supporting arm; an oscillating lever supported from said plow beam; and a cam member secured to said oscillating shaft and adapted to be engaged by said lever to thereby impart oscillatory movement to said sleeve, and the form of which cam member is such that said shaft will be normally held in its central position.

8. In lifting mechanism for plows and in combination with a plow beam or frame, two bracket plates secured to said beam and spaced apart from one another; an oscillating sleeve pivotally supported between said bracket plates; an oscillating bent shaft having an upwardly extending arm extending through said sleeve, and a rearwardly extending guide wheel supporting arm; an oscillating lever supported between said bracket plates; and a cam member secured to the upper end of the upwardly extending arm of said bent shaft and with which the lower end of said lever engages, and the form of which cam is such that said oscillating shaft is normally held in a central position.

9. In lifting mechanism for plows and in combination with a plow beam or frame, two bracket plates secured to said beam and spaced apart from one another; an oscillating sleeve pivotally supported between said bracket plates; an oscillating bent shaft having an upwardly extending arm extending through said sleeve, and a rearwardly extending guide wheel supporting arm; an oscillating lever supported between said bracket plates; a cam member secured to the upper end of the upwardly extending arm of said bent shaft and with which the lower end of said lever engages, and the form of which cam is such that said oscillating shaft is normally held in a central position; and a stationary locking member secured in place between said bracket plates, and bifurcated at its lower end to thereby provide diverging arms between which the rearwardly extending arm of said bent shaft may operate; the arrangement of the parts being such that the rearwardly extending arm of said bent shaft engages with the crotch between said diverging arms when said rearwardly extending arm is in its uppermost position.

10. In lifting mechanism for plows and in combination with a plow beam or frame, an oscillating sleeve pivotally supported from said beam; an oscillating bent shaft supported within said sleeve, and having a rearwardly extending guide wheel supporting arm; operating means adapted to swing said sleeve about its point of pivotal support; and counterbalancing means associated with said sleeve to assist in the movement thereof.

11. In lifting mechanism for plows and in combination with a plow beam or frame, an oscillating sleeve pivotally supported from said frame; an oscillating bent shaft supported within said sleeve and having a rearwardly extending guide wheel supporting arm; a bolt connected with said sleeve; a spring surrounding said bolt; an abutment supported from the plow beam and against which one end of said spring abuts; and means supported from said plow beam and adapted to impart oscillatory movement to said sleeve.

12. In lifting mechanism for plows and in combination with a plow beam or frame, two bracket plates spaced apart from one another and secured to said beam; an oscillating sleeve the lower end of which is pivotally supported between said bracket plates; an oscillating bent shaft having an upwardly extending arm extending through said sleeve, and a rearwardly extending guide wheel supporting arm; an oscillating lever pivotally supported between said plates; a cam member secured to the upper end of the upwardly extending arm of said bent shaft and with which the lower end of said lever engages; a stationary locking member secured in place between said bracket plates and having depending arms diverging from one another, and between which the rearwardly extending arm of said bent shaft operates and by which its extreme movements are limited; an abutment at the upper end of said locking member; a bolt extending through said abutment and one end of which is connected with said sleeve; and a spring surrounding said bolt and acting between said abutment and a second abutment located at the free end of said bolt.

In testimony whereof I affix my signature.

ALVARO S. KROTZ.